United States Patent [19]

Aho, Jr. et al.

[11] Patent Number: 5,587,068
[45] Date of Patent: Dec. 24, 1996

[54] MULTI-ATTITUDE DEAERATOR FOR OIL TANK

[75] Inventors: Wilho V. Aho, Jr., West Palm Beach; Stephen R. Jones, Tequesta; Gregory E. Chetta, Palm Beach Gardens; Terry H. Strout, Palm City, all of Fla.

[73] Assignee: United Technologies Corporation, Hartford, Conn.

[21] Appl. No.: 340,498

[22] Filed: Nov. 15, 1994

[51] Int. Cl.⁶ .......................... B01D 19/00; B01D 21/26
[52] U.S. Cl. .......................... 210/188; 55/257.1; 96/187; 96/209; 96/210; 96/212; 184/6; 210/512.1
[58] Field of Search .......................... 55/257.1; 96/208, 96/209, 210, 211, 212, 187, 188; 210/512.1, 787, 519; 184/6

[56] References Cited

U.S. PATENT DOCUMENTS 2,903,087  10/1956  Glasgow .......................... 96/188
4,947,963  8/1990  Aho, Jr. .......................... 186/6

*Primary Examiner*—David A. Reifsnyder
*Attorney, Agent, or Firm*—Norman Friedland

[57] ABSTRACT

The deaerator includes a chamber that includes vortex generators that centrifuge the oil/air to separate the components and the chamber may operate in all attitudes. In addition wake separators mounted in the inlet of the chamber remove a large percentage of the air from the oil prior to entering the chamber and reintroduce the separated air component in the air removal tube. A dam in the air removal tube is located downstream of the inlet of the wake separated air to assure no oil is extracted from the air tube leaving the chamber. The wake separator consists of one or more tubes extending transversely to the flow of the oil/air stream and the air is removed through rearwardly facing apertures formed in the tube(s).

9 Claims, 7 Drawing Sheets

MULTI-ATTITUDE DEAERATOR FOR OIL TANK

This invention was made under a U.S. Government contract and the Government has rights herein.

TECHNICAL FIELD

This invention relates to oil supply systems for aircraft engines and particularly to deaerators that are operable over all attitudes for precluding the disruption of the supply of oil.

BACKGROUND ART

This invention constitutes an improvement over the oil supply reservoir disclosed in U.S. Pat. No. 4,947,963 granted on Aug. 14, 1990 to W. V. Aho, Jr., the co-inventor of this patent application and assigned to United Technologies Corporation, the assignee common to this patent application.

As noted in this U.S. Pat. No. 4,947,963, supra, it is abundantly important that the quality of the lubrication oil for the moving parts of the engines for powering aircraft is extremely high. To this end it is customary to utilize a forced recirculation system that requires a sump reservoir from which oil is supplied, a pump and distribution lines for delivering the oil to and from the bearings and the like for their proper lubrication and cooling. The tank must contain sufficient oil so as to fill the lines of the distribution system during engine startup and so as to compensate for the oil which may be lost to leakage during operation.

In addition to being capable of continuously supplying oil to the bearing during any attitude of the aircraft throughout its operating envelope, the system must be vented to atmosphere to avoid excess pressure within the lubrication system.

The prior art system disclosed in this U.S. Pat. No. 4,947,963, supra, includes the swirl vessel apparatus disposed in the asymmetrically configured oil tank and consists of an ejector pump, means for multi-attitude operation and the network of supply and return lines for continuously drawing oil from the supply and returning the overflow oil to the oil tank. Essentially, the multi-attitude capability is provided by a plurality of oil make-up lines with inlet openings located in various locations so that any one of the lines will be in contact with the oil in the oil tank for any of the various attitudes. The ejector pump powered by the oil or the oil/air mixture is fluidly connected to each of these lines which serves by the Bernoulli effect to pump the oil from the makeup lines and tangentially inject the oil/air mixture into a cylindrical chamber to form a vortex so as to centrifuge the oil/air mixture for separating the air and oil components if there were any entrained air after having gone through a separate deaerator externally located upstream of the oil supply reservoir. The air is vented to atmosphere through a vent tube located centrally of the vortex chamber and the oil is continuously supplied to the distribution system by an outlet opening peripherally located in the vortex chamber.

While the system disclosed in U.S. Pat. No. 4,947,963, supra, is satisfactory for certain applications, we have found we can combine a deaerator function with the multi-attitude reservoir. This eliminates a separate deaerator component and reduces weight and pressure drop. Ejector performance and the air separation function of the deaerator is improved by providing a wake separator disposed in the flow path located at the entrance of the ejector. The wake separator separates a higher percentage of air that is entrapped in the oil in comparison to heretofore known oil supply systems so as to meet the requirements of current day aircraft applications. In one embodiment the separated air from the wake separator is judiciously discharged into the vortex chamber of the deaerator for removing any entrapped oil in the air, and in another embodiment the air from the wake separator is vented directly into the portion of the vent line where there is some vortex action. In the latter embodiment an annular dam-like member is disposed between the vent outlet and the outlet of the wake separator to prevent any entrapped oil in the wake separator discharge to migrate to the vent outlet.

The wake separator of this invention includes a plurality of tubes judiciously mounted to traverse the flow stream ahead of the nozzles of the ejector pump in the inlet thereof and each tube includes a plurality of axially spaced holes on the downstream side of the tube and a fluid connecting conduit for tangentially discharging the separated air into the vortex chamber or in a judicious location in the vent. The tubes are oriented in the inlet of the vortex generator to maximize on the air separation.

Additionally, it is essential that the pressure losses in the system be held to a minimum as any pressure losses would require larger components to generate the power to overcome those loses which, in turn, would add to the overall weight of the system which is directly equated into engine performance deficits. The ejector pump disclosed in the U.S. Pat. No. 4,947,963, supra, is unsatisfactory in certain respects because it is not as efficient as it might otherwise be. To this end the ejector pump casing in accordance with this invention is discretely configured into a scroll configuration for tangentially directing fluid into the ejector chamber and the flat plate ejectors are eccentrically mounted relative to the central axis of the ejector chamber such that the volume from the inlet of the scroll to the end of the casings annular manifold is progressively lessened to define a convergent passageway to enhance the entry into the nozzles of the ejector pump, and provide an even distribution of pressure and flow to all of the ejectors so that they can operate at the same efficiency and hence, improve overall efficiency as compared with heretofore known devices.

The foregoing and other features of the present invention will become more apparent from the following description and accompanying drawings.

SUMMARY OF THE INVENTION

An object of this invention is to provide an improved swirl vessel of the type that may operate over all attitudes for an oil supply system for aircraft engines and which combines the deaeration function typically performed by a separate component.

A feature of this invention is a wake separator disposed in the inlet of the vortex generator for separating the air from an oil/air mixture and discharging the removed air component into the vortex chamber in one embodiment and in the centrifugal field of the vent tube in another embodiment of this invention.

A feature of this invention is to inject the removed air from the wake separator tangentially into the vortex chamber or the vent tube.

Another feature of this invention is the judicious location of the plurality of wake separator tubes in the inlet of the vortex generator.

Another feature of this invention is the provision of an inlet scroll formed on the injector housing and mounting the ejector nozzles eccentrically relative to the central axis of the deaerator housing.

DESCRIPTION OF THE PREFERRED EMBODIMENT

Figure 1:
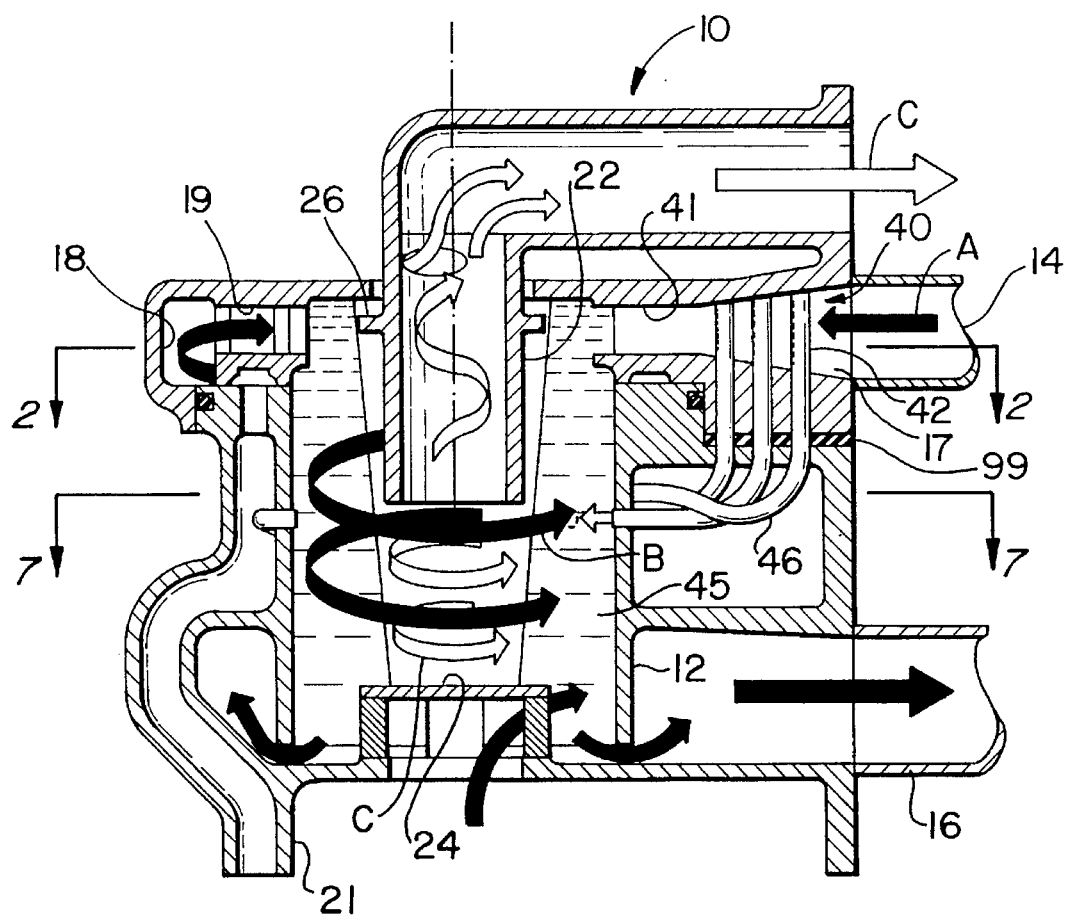
FIG. 1 is a sectional view taken along the longitudinal axis of the multi-attitude deaerator utilizing this invention.

The swirl vessel of the prior art disclosed in U.S. Pat. No. 4,947,963 essentially consists of a cylindrical housing or hollow vessel defining a vortex chamber, upper vortex regulator, flat plate ejector nozzles, make up tubes, ejector mixing section, ejector diffuser, air vent port, air vent tube, lower vortex plate support structure, and annular vortex chamber discharge port which serves to supply oil in all attitudes and remove remaining air entrained in the oil without requiring the use of any moving parts. For a detailed description of this prior art swirl vessel reference should be made to this patent which is incorporated herein by reference.

For the sake of convenience and simplicity only that portion of the prior art swirl vessel that is common to this invention and is necessary for an understanding of this invention will be described herein. For a more complete description reference should be made to U.S. Pat. No. 4,947,963, supra. As used herein the terms "multi-attitude deaerator" and "deaerator" are used interchangeably and referred to the present invention. It should be understood in the art the deaerator of this invention can be used with the vessel that may not include the multi-attitude capabilities.

As can best be seen by referring to all the Figs., the deaerator generally illustrated by reference numeral 10 is comprised of a cylindrically shaped housing or vessel 12 located within an oil tank, or gear box or the like (not shown) which receives return oil typically by a sump pump (not shown) by line 14 and delivers supply oil though line 16 for lubrication and cooling purposes. The oil which is entrained with air from the sump pump first enters the inlet 17 containing a plurality of wake separators generally illustrated by reference numeral 40, then to the nozzle ring generally illustrated by reference numeral 18 consisting of a plurality of nozzles 19 and circumferentially spaced flat plate ejectors 20 (see FIG. 2). The ejectors, typically eight (8) in number, communicate with make-up tubes 21, are powered by the oil/air mixture represented by arrow A discharging through the nozzle for pumping oil extracted from the tank into the vortex chamber. The vortex in the vortex chamber is created by the ejected and makeup flow that is tangentially injected into the vortex chamber. The vortex creates a centrifugal field and is designed to turn at approximately say seventy-five (75) radians per second sufficient to force the oil represented by arrow B which is the denser component of the air/oil mixture against the centrifugal inner surface of the cylindrical vessel 12 to define a say, three (3) inch diameter vortex wall. The less dense air represented by arrow C seeks the vortex center where it is vented through the vent tube 22 and then directed to the systems deoiler (not shown) where it is discharged so as to maintain the system's proper pressure level. The oil proceeds down the vortex chamber wall and flows through an annular slit at the vortex chamber bottom, into the exit manifold and, in turn, returned through line 16 to the main lubrication oil pump inlet (not shown).

The deaerator includes a vortex regulator 24 located at the bottom center of the vortex chamber which serves to size the vortex shape. This allows the excess makeup oil to be returned to the oil tank while providing the chamber with oil for initial engine starting. The vortex regulator 24 also supplies makeup oil as long as the tank oil level is above the vortex regulator plate.

A second vortex regulator 26 is located at the top of the vortex chamber performing a similar function when the engine is operating in an inverted position. Additionally, the vortex regulators 24 and 26 provide communication of the air core of the vortex with the tank air volume for pressure equalization.

As was mentioned earlier in the Background section of this patent application, the heretofore known swirl vessel operates effectively when there is a minimal amount of air entrained in the oil resulting from the presence of a deaerator externally located upstream of the swirl vessel. However, when the externally located deaerator is eliminated, so as to combine the function with a swirl vessel, the device is subjected to an air/oil flow mixture consisting of a significantly larger volume of air.

Figure 7:
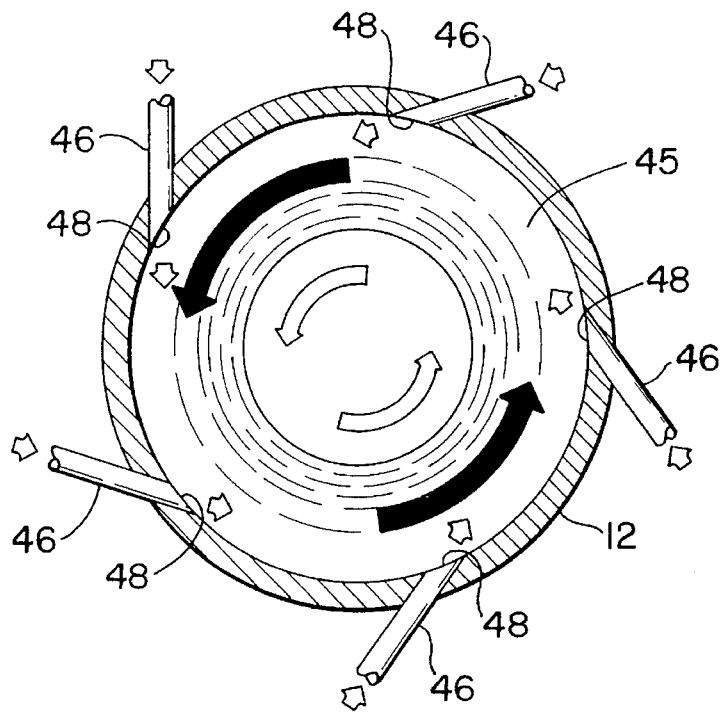
FIG. 7 is a sectional view taken along lines 7—7 of FIG. 1.

According to this invention a plurality of wake separators generally illustrated by reference numeral 40 are mounted in the inlet of the nozzle ring 18. Each wake separator consists of a hollow tubular member 42 (only one being described for simplicity and convenience sake) extending transversely relative to the flow stream. As best seen in FIGS. 3–6, the interaction between the flow stream represented by arrow E and the bluff body created by the tubular member 42 creates a wake and a pressure differential such that the separated air component represented by arrow F tends to reverse itself and flow in an upstream direction. The tubular member 42 includes a plurality of axially spaced holes 44 communicating with the interior of the tube. The air in the wake flows into the tubular member 42 and ultimately into the vent tube 22. In one embodiment exemplified in FIGS. 1 and 7, the collected air in each of the tubular members 42 is admitted into the vortex chamber 45 through lines 46, one line for each of the wake separators 40. The discharge ends 48 of lines 46 are circumferentially disposed about the vessel 12 and are oriented such that the discharge is tangentially admitted into the vortex chamber 45. This assures that if any oil inadvertently is entrained in the separated air, the oil will be centrifuged in the vortex chamber so that essentially only air will escape through vent tube 22.

Figure 9:
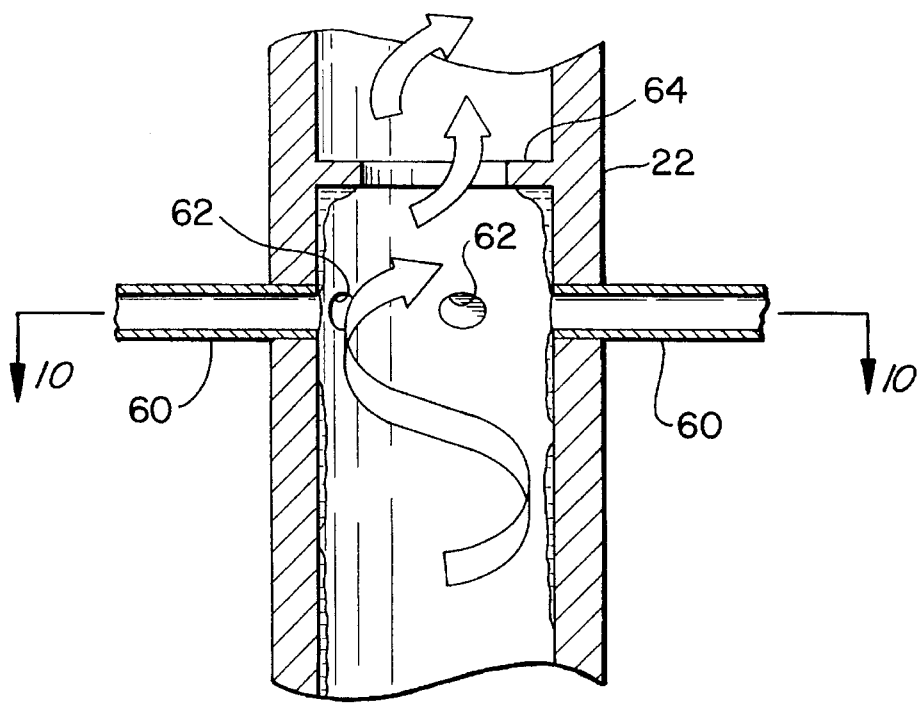
FIG. 9 is an enlarged fragmentary view in section of the vent tube illustrating the separated air of the wake separator of this invention.
Figure 8:
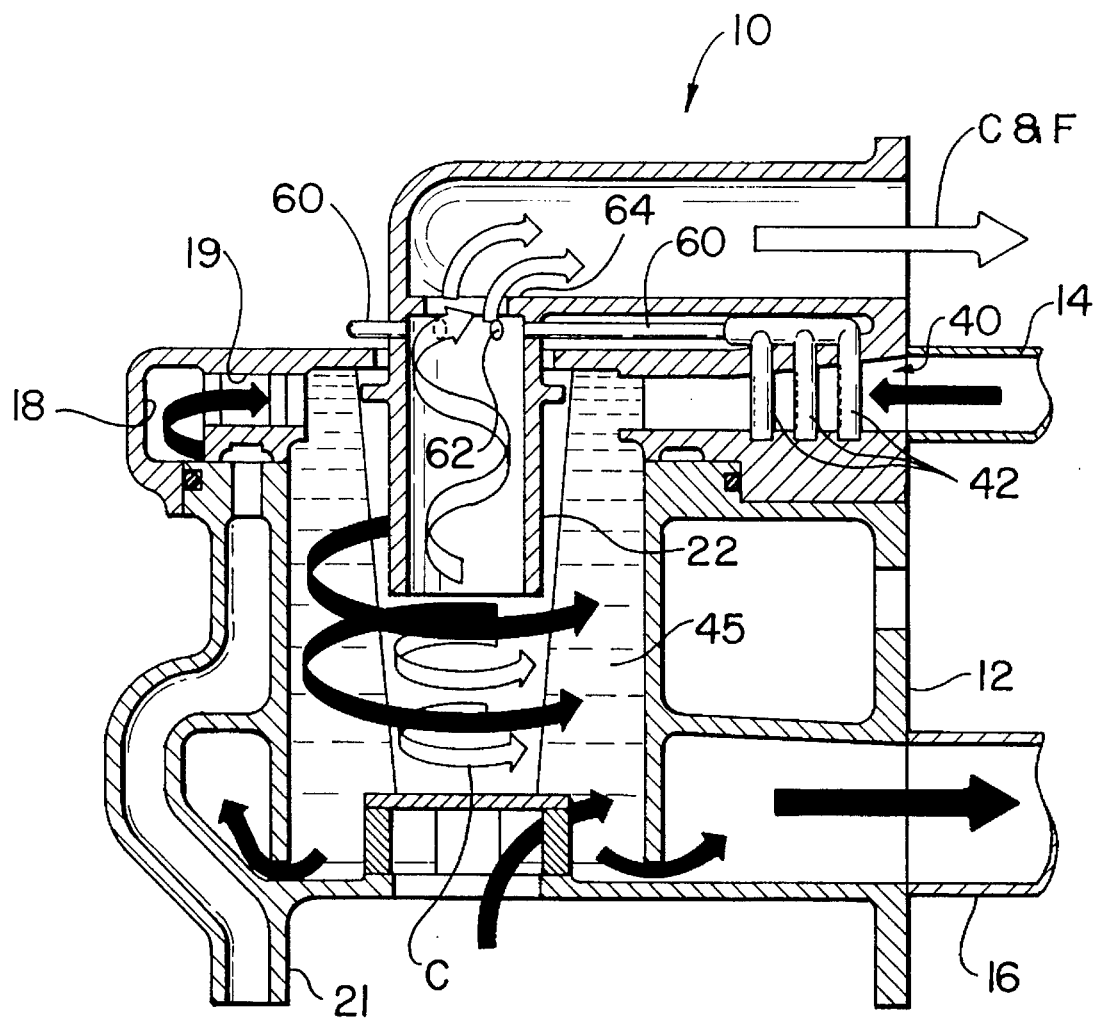
FIG. 8 is a sectional view taken through the longitudinal axis and is identical to FIG. 1 but modified to illustrate the embodiment where the wake separator is connected to the vent tube and the vent tube is modified to accommodate the separated air.
Figure 10:
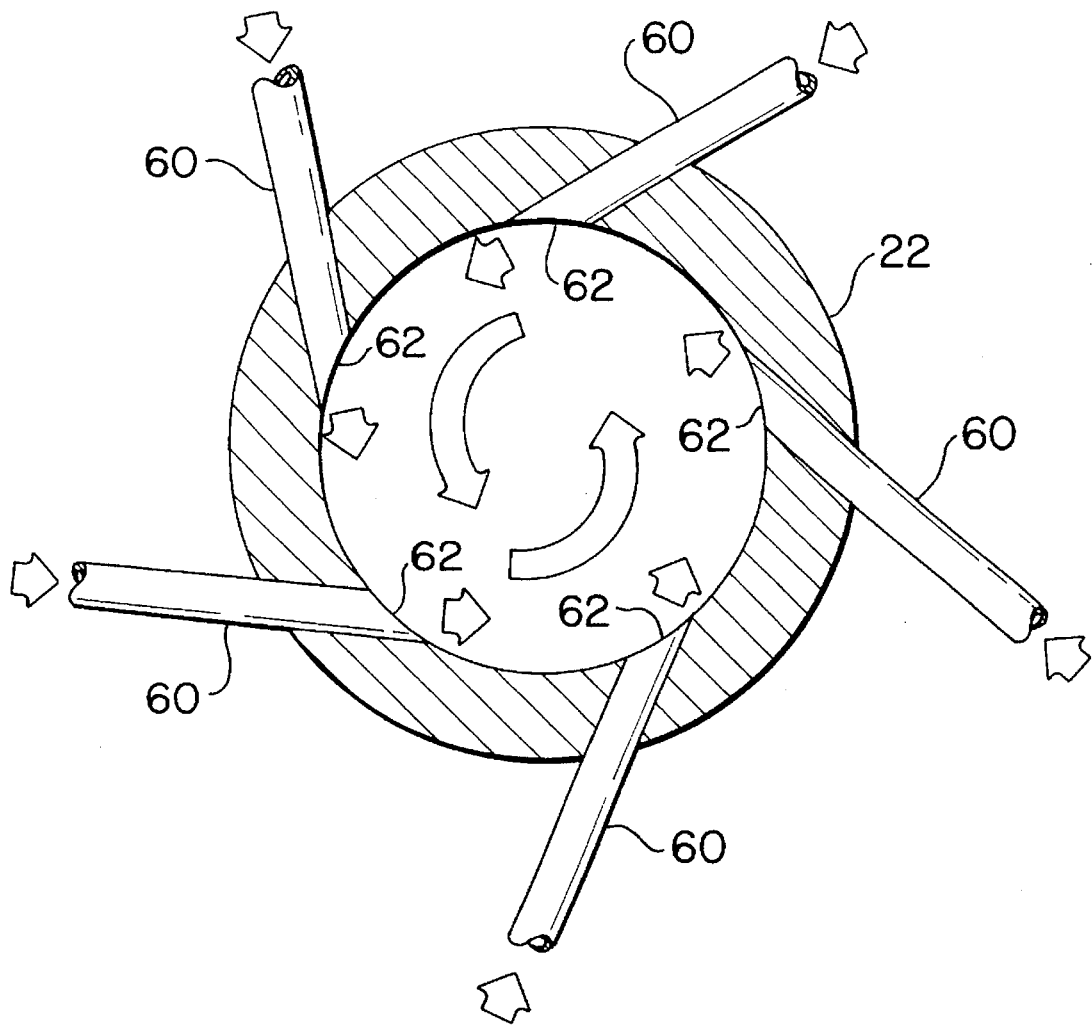
FIG. 10 is a sectional view taken along lines 10—10 of FIG. 9.

In another embodiment exemplified by FIGS. 8–10, the tubular members 42 are fluidly connected to the vent tube 22 at a location where the air is still being centrifuged. The discharge of the air is similar to that described in connection with the elements for dumping the air into the vortex chamber in that the air is conducted from the wake separator 40 through lines 60 and is admitted tangentially through discharge orifice 62 into the vent tube 22. A washer-type element 64 which can be made integral with the vent tube 22 is disposed in the interior diameter of vent tube 22 just above the entrance of the air being discharged by the wake separators 40. This serves to centrifuge oil that is otherwise inadvertently entrained in the separated air, and direct it toward the wall of the vent tube. The washer-like element 64 serves as a dam so that only the air can escape through the smaller diameter defined by the washer like element 64. This oil which forms a vortex on the inner surface of the wall of the vent tube eventually flows downwardly toward the bottom of the vessel.

Figure 4:
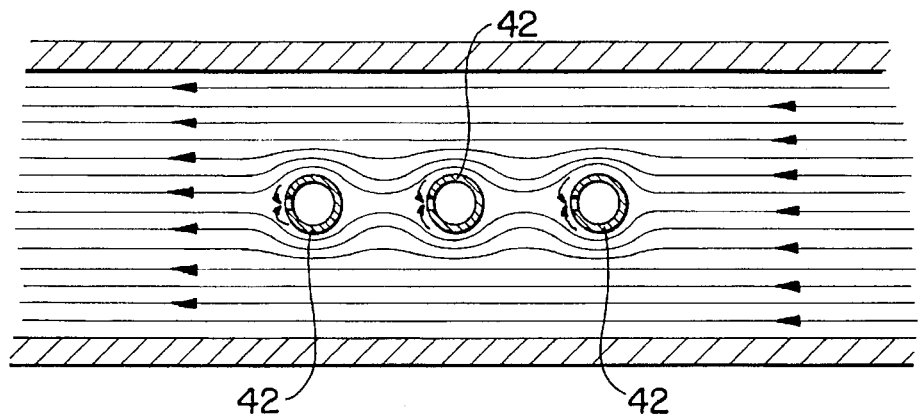
FIG. 4 is another embodiment in section similar to FIG. 3 illustrating another arrangement of the wake separators of this invention.
Figure 5:
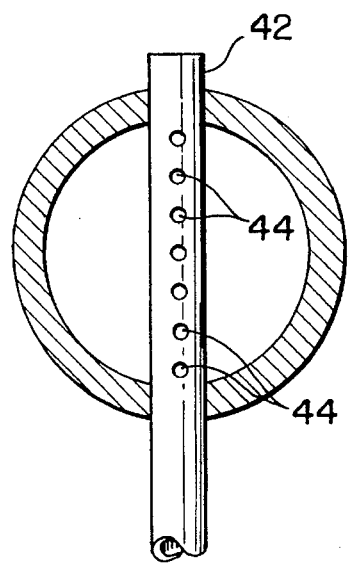
FIG. 5 is a partial view partly in elevation and partly in section illustrating the details of a wake separator.
Figure 6:
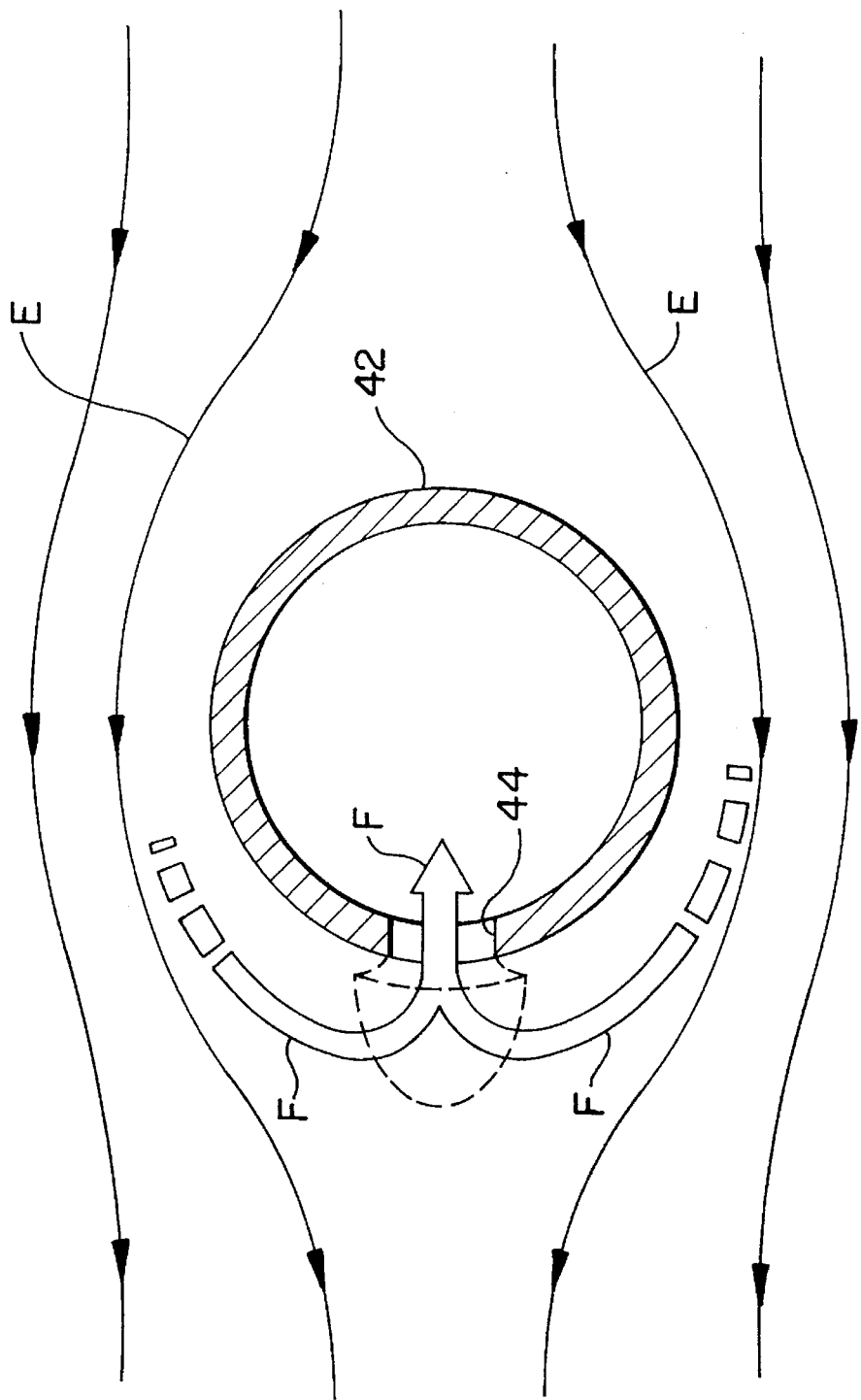
FIG. 6 is an enlarged view in section of the wake separator illustrating the flow pattern.

The number and orientation of the wake separators are predicated on the particular application. In the preferred embodiment (FIG. 3) five (5) tubular members 42 were employed and arranged so that a parallelogram was defined by four of the tubular members 42 and the fifth tubular member 42 was located in the center. As many as seven (7) tubular members were experimented with and this arrangement also proved to be satisfactory. Another embodiment where the tubular members are axially aligned is illustrated in FIG. 4.

In operation, it was found that the majority of the air was separated from the oil/air mixture by the wake separators 40 and the remaining portion of the air was separated in the vortex chamber and the system proved to be at least 95% efficient.

Figure 2:
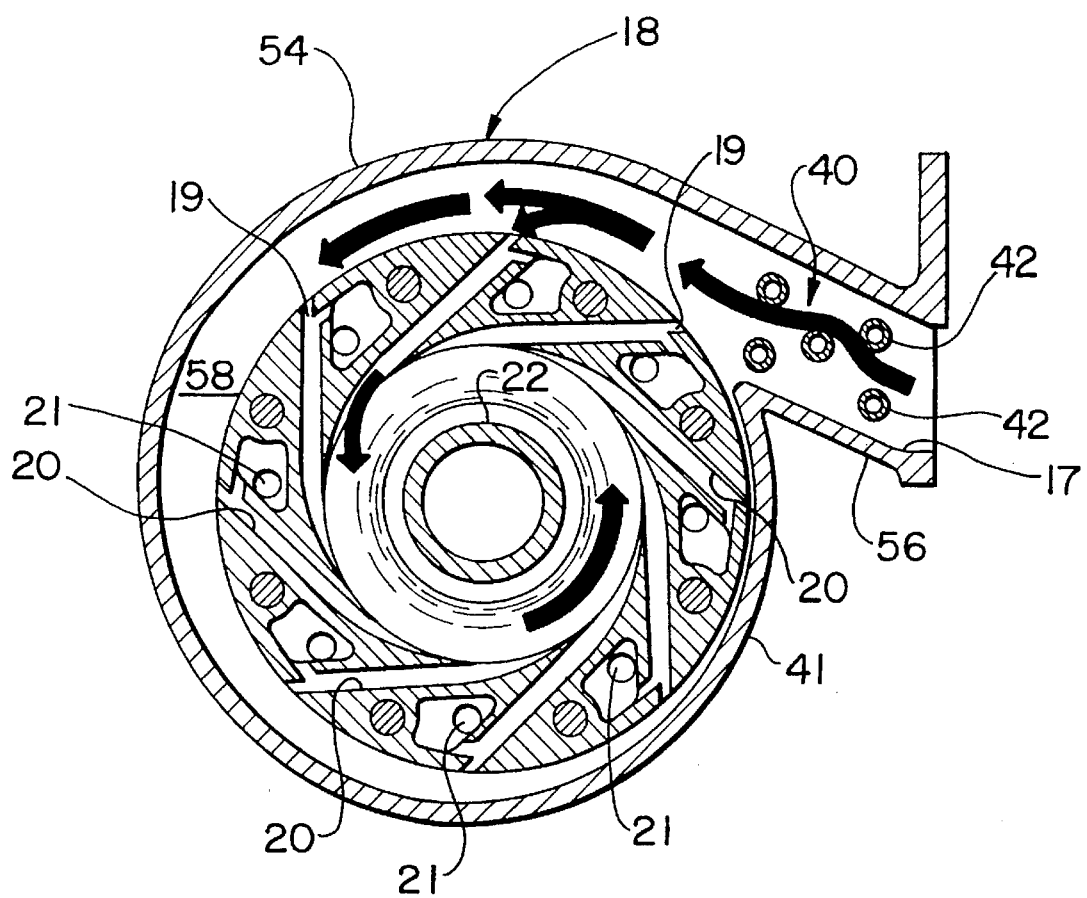
FIG. 2 is a sectional view taken along lines 2—2 of FIG. 1 illustrating the details of the ejector and inlet scroll.
Figure 3:
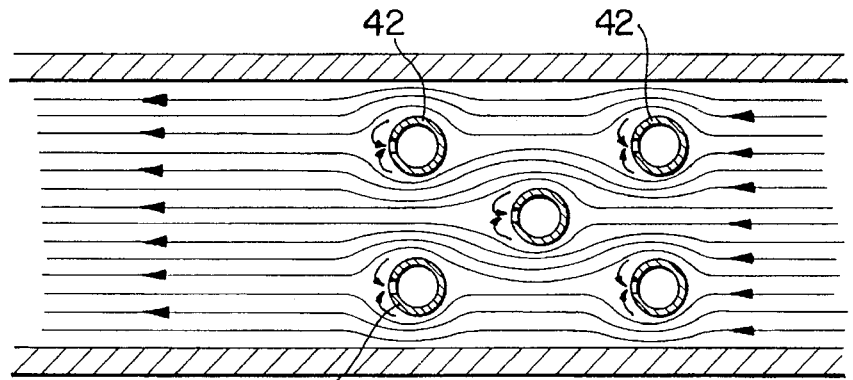
FIG. 3 is a partial view in section illustrating the wake separators and the flow pattern.

As noted in FIG. 2 and in accordance with this invention, the housing 54 of nozzle ring 18 is configured with an inlet scroll 56 that admits the oil or oil/air mixture into the annular manifold tangentially. The central axis of the flat plate ejectors is mounted eccentrically relative to the central axis of the housing 54, such that the volume of the interior of housing 54 is larger at the entrance thereof and progressively decreases toward the end of the annular manifold 58. The reduced volume assures an even distribution of pressure and direction of flow to each of the flat plate ejectors is consistent so that each ejector operates at the same efficiency.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A deaerator apparatus for removing air entrained in oil having wall means for defining an enclosed chamber and vortex generating means in said chamber, the air entrained in oil being an air/oil mixture being centrifuged by said vortex generating means to separate the oil and air from the air/oil mixture, an inlet formed in said wall means for admitting the air/oil mixture into said enclosed chamber wherein the oil is directed toward the wall means of said enclosed chamber, an air removal tube extending through said wall means into said enclosed chamber for removing the air, wake separator means disposed in said inlet for creating a wake and removing a portion of the air from said air/oil mixture prior to said air/oil mixture entering said enclosed chamber, and connecting means interconnecting said wake separator means and said air removal tube.

2. A deaerator apparatus for removing air entrained in oil as claimed in claim 1 wherein said wake separator means includes a tubular member closed at one end extending into said inlet, said tubular member being disposed transversely relative to the flow of the air/oil mixture in said inlet, a plurality of apertures axially spaced on the downstream side of said tubular member relative to the direction of flow of said air/oil mixture.

3. A deaerator apparatus for removing air entrained in oil as claimed in claim 1 wherein said wake separator means includes a plurality of tubular members extending in said inlet defining a predetermined pattern of spacing, a plurality of apertures extending axially on the downstream side of each of said tubular members relative to the direction of flow in said inlet, connection means interconnecting said tubular members and said air removal tube, said connection means including a conduit for each tubular member each having an outlet oriented with respect to said air removal tube such that the air component is discharged tangentially and each outlet is spaced circumferentially around said air removal tube.

4. A deaerator apparatus for removing air entrained in oil as claimed in claim 3 wherein said tubular member is closed on one end and opened on the opposite end, and said one end being disposed in said inlet.

5. A deaerator apparatus for removing air entrained in oil as claimed in claim 4 including dam means in said air removal tube disposed downstream of said outlets relative to the flow of air in said air removal tube.

6. A deaerator apparatus for removing air entrained in oil as claimed in claim 5 wherein said dam means is toroidally shaped and the opening of the toroidal shape is coaxially disposed relative to the longitudinal axis of the air removal tube.

7. A deaerator apparatus for removing air entrained in oil as claimed in claim 1 wherein said wake separating means includes a plurality of tubular members laterally disposed in said inlet relative to the flow of the air/oil mixture in said inlet, a plurality of apertures spaced axially formed on the downstream side of each of said tubular members relative to the flow of the air/oil mixture in said inlet, and connecting means interconnecting said tubular member and said chamber.

8. A deaerator apparatus for removing air entrained in oil as claimed in claim 7 wherein said connecting means includes a conduit connected to each of said tubular members, each of said conduits including an outlet disposed circumferentially in said chamber, and each outlet oriented to flow the air discharging therethrough tangentially and in a direction of the centrifuged air in said chamber.

9. Wake separator means for creating a wake and removing a portion of the air from an air/oil mixture, conduit means for flowing the air/oil mixture from one location to another location, an air vent for removing the air component from said conduit, connecting means interconnecting said wake separator means and said air vent, said wake separator means including at least one tubular member closed at one end extending into said conduit, said tubular member being disposed transversely relative to the flow of the air/oil mixture in said conduit, a plurality of apertures axially spaced on the downstream side of said tubular member relative to the direction of flow of said air/oil mixture.

* * * * *